United States Patent Office

3,372,116
Patented Mar. 5, 1968

3,372,116
PREPARATION OF BASIC METAL
PHENATES AND SALICYLATES
Norman A. Meinhardt, Lyndhurst, Ohio, assignor to The
Lubrizol Corporation, Wickliffe, Ohio, a corporation of
Ohio
No Drawing. Continuation-in-part of application Ser. No.
493,264, Oct. 5, 1965. This application Apr. 17, 1967,
Ser. No. 631,144
20 Claims. (Cl. 252—36)

This application is a continuation-in-part of copending application Ser. No. 493,264, filed Oct. 5, 1965, now abandoned.

This invention relates to novel oil-soluble compositions of matter and methods for their preparation. More particularly, it relates to an improvement in the method for preparing a basic metal phenate by reacting, at a temperature between about 25° C. and the reflux temperature, (A) a hydrocarbon-substituted phenol having at least 6 carbon atoms in the hydrocarbon substituent, a mixture of said phenol with up to an equivalent amount of a hydrocarbon-substituted succinic acid or anhydride having at least about 6 carbon atoms in the hydrocarbon substituent, or a substantially neutral alkali metal or alkaline earth metal salt of either of the foregoing, (B) about 1–10 equivalents, per equivalent of (A), of a calcium or strontium base, and (C) carbon dioxide; which improvement comprises carrying out the reaction in the presence of about 0.002–0.2 equivalent, per equivalent of said calcium or strontium base, of a carboxylic acid having up to about 100 carbon atoms or an alkali metal, alkaline earth metal, zinc or lead salt thereof.

Stop-and-go driving, characteristic of light duty and intermittent operating conditions at low temperatures, tends to promote contamination of lubricating oils with unburned fuel and fuel resins, moisture, soot, and lead salts. To combat this type of oil contamination, dispersants are added to the lubricating oils in an attempt to maintain the contaminants in suspension as finely divided particles. To the extent that these dispersants are effective, the contaminants are not permitted to deposit and produce excessive piston varnish, ring sticking, and sludge.

Severe, heavy-duty engine service, especially in diesel engines where high temperature conditions prevail, promotes oil oxidation and the formation of engine varnish and sludge deposits. Under these conditions, dispersant additives keep the blow-by fuel soots and fuel resins in suspension so that these oil-insoluble contaminants will not deposit and cause excessive piston varnish, ring sticking and sludge. These dispersant additives have, however, had limited effect in combating sludge conditions caused by light-duty or stop-and-go driving service.

Oil-soluble highly basic metal salts, e.g., metal salt of acidic materials such as petroleum sulfonic acids and hydrocarbon-substituted carboxylic acids, which contain a stoichiometric excess of metal, are known to impart dispersancy characteristics to lubricating oils. Such basic metal salts can be prepared by carbonating, in the presence of a promoter, mixtures of an acidic reactant and a stoichiometric excess of a metal compound. Useful promoters include phenolic compounds, glycols, alcohols, water, nitroalkanes and other active hydrogen compounds. The carbonation is effective both to clarify the process mixture and the resulting product, and to increase the amount of the ordinarily oil-insoluble metal compound in the solution and the product.

Oil-soluble basic metal phenates also have been prepared by carbonating mixtures of phenols and calcium hydroxide in the presence of glycols or glycol ethers. The amount of excess metal which is incorporated into these basic metal phenates has not been sufficient, however, to satisfy the demand for more highly basic dispersants in the lubricating field.

A principal object of this invention, therefore, is to provide a novel and improved process for preparing oil-soluble basic compositions of matter.

A further object is to provide novel compositions which are useful as additives, especially dispersants, in hydrocarbon oils and similar lubricating compositions.

A further object is to provide an improved process for preparing basic metal phenates.

Other objects will in part be obvious and will in part appear hereinafter.

As mentioned above, basic metal phenates may be obtained by carbonating a reaction mixture which comprises a phenolic compound and a metal base such as a metallic oxide or hydroxide. The amount of metal which is incorporated into the basic metal phenate may be increased through the use of a promoter such as an alcohol or a phenol. In the method of this invention, the amount of metal incorporated into the basic metal salts is increased through the use of a catalyst which may be a carboxylic or a metal carboxylate. The presence of a carboxylic acid or metal carboxylate in the reaction mixture not only improves the amount of metal which is incorporated into the product but improves the amount of product which is obtained in a given reaction.

The improved method of this invention is especially useful in preparing metal salts of phenolic compounds. The term "phenolic compounds" includes hydrocarbon-substituted phenols and hydrocarbon-substituted phenol sulfides. The hydrocarbon substituent of the hydrocarbon-substituted phenols and phenol sulfides contains at least about 6 carbon atoms and may contain up to about 7,000 aliphatic carbon atoms. Examples of such substituents include alkyl radicals such as hexyl, cyclohexyl, heptyl, isooctyl, octyl, decyl, tridecyl, hexadecyl, eicosyl and tricosyl; radicals having a molecular weight of about 85–100,000 and derived from the polymerization of 1-monoolefins (terminal olefins) such as ethylene, propene, 1-butene, isobutene, 1-hexene, 1-octane and 2-methyl-1-heptene; and radicals having a molecular weight of about 85–100,000 and derived from the polymerization of medial olefins (olefinic linkage not at the terminal position), such as 2-butene, 2-pentene, 3-pentene, and 4-octene. It is preferred that the hydrocarbon substituent be a radical derived from a monoolefin and, more particularly, that the olefin be propene, 1-butene or isobutene. Also, it is preferred that the hydrocarbon substituent have a molecular weight of about 150–1,750, or contain from about 10 to about 125 aliphatic carbon atoms. In some instances, however, a higher molecular weight radical, e.g., one having a molecular weight of about 50,000–100,000, is desirable since it has been found that such a radical can impart viscosity index improving properties to the products of this invention.

The hydrocarbon substituent and the aryl nucleus of the phenols may contain inorganic or other organic substituents such as hydroxy, carboxy, mercapto, halogen, nitro, amino, nitroso, sulfo, and disulfo radicals. Particularly preferred in this regard are compounds containing carboxy substituents on the aryl nucleus, especially hydrocarbon-substituted salicylic acids.

Introduction of the hydrocarbon substituent onto the phenol can be effected by mixing the hydrocarbon and the phenol at a temperature of about 50–200° C. in the presence of a suitable catalyst, such as aluminum trichloride, boron trifluoride, zinc chloride or the like. The radical can also be introduced by other alkylation processes known in the art.

The term "hydrocarbon-substituted phenol sulfides" is meant to include di-(hydrocarbon-substituted phenol) monosulfides, hydrocarbon-substituted phenol sulfides, poly-(hydrocarbon-substituted phenol)polysulfides, and other products obtained from the reaction of hydrocarbon-substituted phenols with sulfur monochloride, sulfur dichloride or elemental sulfur. The molar ratio of the phenol to the sulfur compound can be from about 1:0.5 to about 1:1.5, or even higher. For example, phenol sulfides are readily obtained by mixing, at a temperature above about 60° C., one mole of a hydrocarbon-substituted phenol and 0.5 to about 1.5 moles of sulfur dichloride. It is preferred that the reaction mixture be maintained at about 100° C. for about 2–5 hours and that the resulting sulfide be dried and filtered. When elemental sulfur is used in the reaction, temperatures of about 200° C. or higher are sometimes desirable. It is also desirable that during the drying step, the sulfides be bubbled with nitrogen or some inert gas.

The term "sulfur dichloride" is meant to include sulfur dichloride and its degradable products. It is recognized that some of the sulfur dichloride, due to storage time, will degrade to sulfur monochloride and chlorine gas. However, it is believed that the degradation attains an equilibrium at about 75% sulfur dichloride and 25% sulfur monochloride. Therefore, this invention contemplates the use of sulfur dichloride as well as mixtures of sulfur dichloride and sulfur monochloride.

Hydrocarbon-substituted salicylic acids may be prepared from the phenols by reaction of a salt, preferably an alkali metal salt, thereof with carbon dioxide. This reaction may be carried out at atmospheric or superatmospheric pressure in a suitable solvent, preferably mineral oil.

The phenols which are useful in this invention include the various positional isomers of the following substituted phenols: hexylphenol, cyclohexylphenol, heptylphenol, nonylphenol, dodecylphenol, heptylphenol sulfide, decylphenol sulfide, and hydrocarbon-substituted phenols, phenol sulfides, salicylic acids and salicylic acid sulfides wherein the hydrocarbon substitutent contains from about 12 to 7,000 carbon atoms and is a polymer of an olefin having 2 to 8 carbon atoms.

As mentioned previously, the phenolic compound may be used in combination with up to an equivalent amount of a hydrocarbon-substituted succinic acid or anhydride. The hydrocarbon substituent on the succinic acid or anhydride may contain about 1–7,000 aliphatic carbon atoms, preferably at least 6. Of the phenols to be used therewith, hydrocarbon-substituted phenol sulfides are preferred. The following mixtures are illustrative: 0.5 equivalent of heptylphenol sulfide and 0.5 equivalent of a hydrocarbon-substituted succinic compound; 0.7 equivalent of heptylphenol sulfide and 0.3 equivalent of a hydrocarbon-substituted succinic compound. In other words, the mixture being carbonated may contain varying amounts of the succinic compound but never more than an amount which is equivalent to the amount of phenol present in the mixture.

The hydrocarbon-substituted succinic compounds include hydrocarbon-substituted succinic anhydrides and acids. These succinic compounds are readily obtained by the reaction of maleic anhydride or maleic acid with an olefin, a chlorinated hydrocarbon, or a hydrocarbon containing an activating polar substituent, i.e., a substituent which is capable of activating a hydrocarbon molecule with respect to the reaction with maleic anhydride or maleic acid. For example, the succinic compounds may be obtained by heating equivalent amounts of maleic anhydride and a chlorinated hydrocarbon at a temperature within the range of from about 100° C. to about 200° C. Succinic anhydrides prepared in this manner can be hydrolyzed to the corresponding acids by treatment with water or steam. The succinic acids are preferred in the process of this invention, and the preferred substituent is a polyisobutenyl radical.

It is sometimes convenient to use alkali metal or alkaline earth metal salts of the phenols, salicylic acids or succinic acids, rather than the free acids, in the method of this invention. The normal calcium or strontium salts are preferred, and their use is especially advantageous when an overbased salicylate is being prepared. In general, the term "phenol" or "acid" when used herein includes salts thereof.

The amount of phenolic compound or hydrocarbon-substituted succinic acid to be used in the process is expressed in terms of chemical equivalents, heptylphenol having one equivalent per mole, heptylphenol sulfide having 2 equivalents per mole and the hydrocarbon-substituted succinic acid having 2 equivalents per mole. For the purpose of this invention, a salicylic acid is deemed to have only one equivalent per mole despite the fact that both hydroxyl groups are acidic to some extent.

The calcium and strontium bases useful in this invention include calcium and strontium oxides and hydroxides. The addition of the metal base to the acidic material can be made in one, two, or more steps.

The amount of the metal base added to the reaction mixture varies from about 1 to about 10 equivalents per equivalent of phenolic compound and is determined on the basis of the desired metal ratio in the final product. "Metal ratio" is defined as the value obtained by dividing the total number of equivalents of metal in the basic salt by the equivalents of metal in the neutral salt. For example, a metal ratio of 2 indicates a salt contains twice as much metal as the neutral salt thereof. Thus, if a metal ratio of 4 is desired, there should be added at least 4 times the stoichiometric amount of metal base necessary to prepare the neutral salt of the acidic material. The amount of metal base is defined in terms of chemical equivalents, e.g., one equivalent of calcium hydroxide is one-half its molecular weight.

A lower alcohol is useful but not necessary in the process of this invention to help solubilize the metal compound, to help fluidize the process mixture, and to act as a promoter in the carbonation step. The lower alcohols useful in the process of this invention include alcohols containing up to about 8 carbon atoms and include monohydric alcohols as well as polyhydric alcohols. Examples of useful alcohols include methanol, ethanol, 1-propanol, isopropanol, isobutanol, 2-pentanol, 2,2-dimethyl-1-propanol, 1-hexanol, 1-octanol, ethylene glycol, 1,3-propanediol, 1,5-pentanediol, glycerol, and mixtures thereof. Preferably, a maximum of about 4 equivalents of alcohol per equivalent of metal base is used, but more alcohol may be present if desired.

Especially for the preparation of overbased salicylic acids, it has been found that alcohols in the $C_{4-6}$ range are particularly effective as promoters and afford products of very high metal ratios. The preferred alcohol for this purpose is a mixture of isobutyl and amyl alcohols, usually in a 65:35 weight ratio, respectively.

When carbonating the mixture of metal base and the phenolic compound, it is beneficial to carry out the reaction in the presence of a promoter. Promoters known in the art, such as phenols, alcohols, glycols, etc., generally afford products with lower metal ratios and in lower yield than is often desired. However, with the use of the promoters of this invention, the reaction of the metal base and the acidic material is facilitated and products having high metal ratios, previously unattainable, can be obtained. The promoters of this invention also improve the yield of the metal phenates obtained.

The promoters useful in this invention are carboxylic acids containing about 1–100 carbon atoms and metal salts thereof, the metal of said salts being alkali metals, alkaline earth metals, zinc or lead. The acid may be an alkyl or an aryl acid and may be saturated or unsaturated. The term "alkyl" is used to denote univalent aliphatic, cycloaliphatic, aromatic-aliphatic, and alicyclic radicals. In like manner, the term "aryl" is used to denote univalent aromatic, aliphatic-aromatic, and cycloaliphatic-aromatic radicals. These terms, i.e., "alkyl" and "aryl" are intended to encompass hydrocarbon radicals as well as radicals which are substantially hydrocarbon in character. In the latter instance, the radicals may contain non-polar substituents such as halo, ether, or nitro groups as long as these substituents do not interfere with the reaction of the process of this invention, and as long as they are not present in such proportions as to alter significantly the hydrocarbon character of the radicals. The term "carboxylic acids" is meant to include monocarboxylic acids, dicarboxylic acids, and other acids having a plurality of carboxyl groups.

The monocarboxylic acids useful as promoters include compounds conforming to the general structure

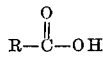

wherein R is a hydrocarbon radical containing from one to about 100 carbon atoms. The monocarboxylic acids having a large number of carbon atoms, namely from about 10 to 100, may be prepared by the reaction of halogenated polymers such as a chlorinated polymer of isobutene with an unsaturated acid such as acrylic acid or methacrylic acid. Specific examples of monocarboxylic acids include formic acid, acetic acid, propionic acid, acrylic acid, butyric acid, isobutyric acid, methacrylic acid, valeric acid, 2,4-dimethyl-pentanoic acid, 1-hexanoic acid, caprylic acid, capric acid, palmitic acid, stearic acid, isostearic acid, linoleic acid, behenic acid, and hydrocarbon-substituted propionic acids wherein the hydrocarbon substituent contains about 12–100 aliphatic carbon atoms.

The dicarboxylic acids useful as promoters include compounds conforming to the general structure

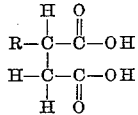

wherein R is a hydrocarbon radical containing from about 6 to about 100 aliphatic carbon atoms. The R group includes olefin polymers derived from ethylene, propylene, 1-butene, isobutene, 1-pentene, 2-pentene, 1-hexene, 3-hexene, etc. Such acidic compounds can be obtained, for example, by mixing, at a temperature of about 100–200° C., equimolar amounts of maleic anhydride and an olefin polymer, a chlorinated hydrocarbon, or other hydrocarbon containing a polar substituent which is capable of activating the hydrocarbon molecule in respect of the reaction with maleic anhydride. The resulting product is a hydrocarbon-substituted succinic anhydride which can be converted to the acid thereof by treatment with water or steam. The succinic acid can also be prepared by substituting maleic acid for the above maleic anhydride. The succinic acid is preferred over the anhydride.

The metal salts of the above carboxylic acids are also useful as promoters. These salts can be prepared by reacting the carboxylic acid with a basic alkali metal, alkaline earth metal, zinc or lead compound. Examples of the useful salts are sodium acetate, lithium acetate, potassium stearate, calcium formate, calcium acetate, calcium propionate, calcium isostearate, calcium salt of a polyisobutene (having an average of 66 carbon atoms) substituted succinic acid, barium caproate, barium salt of a polybutene (having an average of 22 carbon atoms) substituted propionic acid, strontium acetate, strontium caprylate, strontium linoleate, zinc acetate, zinc behenate, lead propionate, and lead caprate.

The amount of promoter to be used in the reaction mixture is dependent on the amount of the metal base in the mixture and is about 0.02–0.20 equivalent per equivalent of the metal compound. The equivalence of the promoter is based on the number of carboxy radicals in the molecule. For example, acetic acid has one equivalent per mole, calcium acetate has 2 equivalents per mole, and neutral calcium succinate has 2 equivalents per mole. The preferred promoters in the process of this invention are carboxylic acids containing up to about 10 carbon atoms and, more particularly, monocarboxylic acids containing up to 10 carbon atoms, and alkaline earth metal salts thereof, such as acetic acid and calcium acetate.

The basic metal phenates of this invention can be prepared by carbonating, at a temperature between about 25° C. and the reflux temperature, a mixture of the metal base and the phenolic compound in the presence of the promoter and, optionally, in the presence of an alcohol or solvent. The carbonation is conducted in such a manner as to reduce substantially the titratable basicity of the mixture. Prior to carbonation, there are essentially two materials in the mixture which are susceptible to reaction with carbon dioxide: (1) the excess metal base and (2) the metal salt of the phenolic material. Such a mixture is initially heterogeneous because of the excess, insoluble metal base. As carbonation proceeds, the basic metal reactant becomes solubilized in the mixture and the carbonated product eventually becomes a homogeneous composition containing an unusually large amount of the metal. The mechanism of the formation of the homogeneous product is not fully understood. It is believed, however, that carbonation converts the excess metal base to a carbonate or bicarbonate which forms a homogeneous complex with the metal salt of the phenolic reactant. The complex is readily soluble in solvents such as benzene, xylene, naphtha, and mineral oil. It is not necessary for all the metal base to be converted by carbonation to produce a soluble homogeneous product. In many instances, a homogeneous product is obtained when as little as 75% of the excess metal base is carbonated.

The amount of carbon dioxide used in the carbonation depends upon the desired basicity of the particular product in question. Generally, more than the theoretical quantity of carbon dioxide is required to achieve the desired basicity. Ordinarily, a substantially neutralized product, i.e., one which the neutralization number is about 20 or less, is desired. The neutralization number indicates titratable basicity of the product and is measured by using phenolphthalein indicator.

The sequence in which the reactants are preferably added to make up the reaction mixture is (1) the phenolic reactant, (2) the metal base, (3) the lower alcohol, and (4) the promoter. Although this sequence is preferred, the order of addition can be changed. Also, portions of the reactants can be added at different intervals within the sequence, e.g., half the metal base can be added after the phenolic reactant and the other half can be added after the promoter or lower alcohol is added. It is recommended that the reactants be added to an aqueous mineral oil mixture, i.e., a mineral oil mixture containing from about 2% to about 14% water.

A preferred procedure for preparing the overbased products of this invention involves mixing, at a temperature above about 25° C. and up to about the reflux temperature, an aqueous mineral oil mixture containing the metal base and the phenolic material or a mixture of the phenolic material with up to about an equivalent amount of a hydrocarbon-substituted succinic anhydride or acid. The mixture is agitated until the phenolic material is neutralized, or until a portion thereof is neutralized. The reaction mixture is then dried at about 150° C., and the residue is filtered. To the filtrate there is added, at a temperature between about 25° C. and the reflux temperature, about 0.4–14 equivalents, per equivalent of the total basic metal compound, of a lower alcohol and about 0.02–0.2 equivalent, per equivalent of the total metal base, of a hydrocarbon-substituted carboxylic acid or salt thereof. Also, there may be added additional metal base during the latter processing step to give a higher metal ratio. The mixture is then carbonated, at a temperature between 50° C. and the reflux temperature, until the desired neutralization number is attained. Thereupon, the mixture is dried and the residue is filtered. The product is an overbased phenate.

The use of toluene, higher alcohols, xylene, and other diluents is sometimes desirable to improve the mixing of the reactants. For example, a mixture of amyl and isobutyl alcohols improves the fluidity of the reaction mixture.

The following examples are illustrative of the method of this invention. Parts are by weight unless otherwise specified.

EXAMPLE 1

To 6,072 parts (22 equivalents) of a tetrapropylene-substituted phenol (prepared by mixing, at 138° C. and in the presence of a sulfuric acid treated clay, phenol and tetrapropylene), there is added at 90°–95° C., 1,134 parts (22 equivalents) of sulfur dichloride. The addition is made over a 4-hour period whereupon the mixture is bubbled with nitrogen for 2 hours, heated to 150° C. and filtered. To 861 parts (3 equivalents) of the above product, 1,068 parts of mineral oil, and 90 parts of water, there is added at 70° C., 122 parts (3.3 equivalents) of calcium hydroxide. The mixture is maintained at 110° C. for 2 hours, heated to 165° C. and maintained at this temperature until it is dry. Thereupon, the mixture is cooled to 25° C. and 180 parts of methanol is added. The mixture is heated to 50° C. and 366 parts (9.9 equivalents) of calcium hydroxide and 50 parts (0.633 equivalent) of calcium acetate are added. The mixture is agitated for 45 minutes and is then treated at 50°–70° C. with carbon dioxide at a rate of 2–5 cubic feet per hour for 3 hours. The mixture is dried at 165° C., and the residue is filtered. The filtrate has a calcium content of 8.8%, a neutralization number of 39 (basic), and a metal ratio of 4.4.

EXAMPLE 2

To 6,050 parts (22 equivalents) of the tetrapropylene-substituted phenol described in Example 1, there is added at 100° C. 1,133 parts (22 equivalents) of sulfur dichloride. The mixture is heated to 150° C. and bubbled with nitrogen until only trace amounts of hydrogen chloride are present. To 588 parts (2 equivalents) of the above product, 926 parts of mineral oil, and 60 parts of water, there is added at 70° C., 74 parts (2 equivalents) of calcium hydroxide. The mixture is maintained at 110° C. for 2 hours, heated to and maintained at 150° C. for 30 minutes, and cooled to 25° C. whereupon 3,660 parts of methanol is added. The mixture is then heated to 50° C. and 222 parts (6 equivalents) of calcium hydroxide and 26 parts (0.4 equivalent) of calcium formate are added. The mixture is agitated for 30 minutes and treated at 55° C. with carbon dioxide at a rate of 2 cubic feet per hour for 4 hours. The mixture is dried at 150° C. and the residue is filtered. The filtrate has a calcium content of 6.5%, a neutralization number of 35 (basic), and a metal ratio of 2.8.

EXAMPLE 3

To 5,880 parts (12 equivalents) of a polyisobutene-substituted phenol (prepared by mixing, at 54° C. and in the presence of boron trifluoride, equimolar amounts of phenol and a polyisobutene having an average of 25 aliphatic carbon atoms) and 2,186 parts of mineral oil, there is added over 2.5 hours and at 90°–110° C., 618 parts (12 equivalents) of sulfur dichloride. The mixture is heated to 150° C. and bubbled with nitrogen. To 3,449 parts (5.25 equivalents) of the above product, 1,200 parts of mineral oil, and 130 parts of water, there is added at 70° C., 147 parts (5.25 equivalents) of calcium oxide. The mixture is maintained at 95°–110° C. for 2 hours, heated to and maintained at 160° C. for 1 hour and then cooled to 60° C. whereupon 920 parts of 1-propanol, 307 parts (10.95 equivalents) of calcium oxide, and 46.3 parts (0.78 equivalent) of acetic acid are added. The mixture is then contacted with carbon dioxide at a rate of 2 cubic feet per hour for 2.5 hours. The mixture is dried at 190° C. and the residue is filtered to give the desired product.

EXAMPLE 4

To 386 parts (2 equivalents) of heptylphenol, 300 parts of xylene, and 7.3 parts (0.12 equivalent) of acetic acid, there is added, at 90° C., 111 parts (3 equivalents) of calcium hydroxide. The mixture is contacted with carbon dioxide at the rate of 2 cubic feet per hour for 3 hours at 90°–100° C. and is then azeotropically dried. The residue is filtered to give the desired product.

EXAMPLE 5

To 386 parts (2 equivalents) of heptylphenol, 200 parts of mineral oil and 30 parts of water, there is added, at 75° C., 103.6 parts (2 equivalents) of strontium oxide. The mass is agitated for 1 hour at 95° C., and then dried by heating to 150° C. Thereafter, the mixture is cooled to 60° C. and there is added 116.2 parts (0.6 equivalent) of 1-hexanoic acid, 207.2 parts (4 equivalents) of strontium oxide and 372 parts (12 equivalents) of ethylene glycol. The mass is then contacted, at 135° C., with carbon dioxide. The carbonated mixture is dried at 205° C./100 mm. Hg, and the residue is diluted with 300 parts of xylene. The diluted residue is filtered to give the desired product.

EXAMPLE 6

To 933 parts (1 equivalent) of a polyisobutene-substituted phenol wherein the polyisobutene radical contains about 60 carbon atoms, 1,000 parts of mineral oil, and 20 parts of water, there is added, at 60° C., 74 parts (2 equivalents) of calcium hydroxide. The mixture is maintained at 80° C. for 0.75 hour and then dried at 140° C. Thereafter, the mass is cooled to 70° C. and there are added 148 parts (4 equivalents) of calcium hydroxide, 8.9 parts (0.12 equivalent) of propionic acid, and 60 parts of 1-propanol. The reaction mass is bubbled with carbon dioxide at 90° C. until the desired neutralization number is attained. The mass is dried and the residue is filtered to give the desired product.

EXAMPLE 7

To 5,100 parts (25 equivalents) of heptylphenol, there is added, at 60°–100° C., 1,290 parts (25 equivalents) of sulfur dichloride. The mixture is heated to 150° C. and bubbled with nitrogen to give the desired phenol sulfide. To a mixture containing 1,110 parts (5 equivalents) of the above phenol sulfide, 1,360 parts of mineral oil, and 150 parts of water, there is added at 70° C., 185 parts (5 equivalents) of calcium hydroxide. The mixture is maintained at 100° C. for 2 hours, heated to and maintained at 150° C. for 1 hour, and cooled to 25° C. whereupon 150 parts of methanol is added. The mixture is then heated to 50° C. and 93 parts (2.5 equivalents) of calcium hydroxide and 30 parts (0.38 equivalent) of calcium acetate are added. After 15 minutes of agitation, the mixture is bubbled at 55° C. with carbon dioxide at a rate of 2 cubic feet per hour for 3 hours. The mixture is dried at 160° C. for 15 minutes and the residue is filtered. The filtrate has a calcium content of 5.3%, a neutralization number of 1.7 (acid), and a metal ratio of 1.3.

EXAMPLE 8

736 parts (1.6 equivalents) of a polyisobutene-substituted phenol (prepared by mixing, at 50° C. and in the presence of boron trifluoride, equimolar amounts of a phenol and a polyisobutene having an average of 23.8 carbon atoms), there is added over 7 hours and at 92°–138° C., 82 parts (0.75 equivalent) of sulfur dichloride. The mixture is maintained at 99° C. for 1 hour, and is then bubbled with nitrogen at 149°–152° C. for 2.2 hours. To 380 parts (0.8 equivalent) of the above product, 130 parts of mineral oil, and 13 parts of water, there is added at 71° C., 32 parts (0.86 equivalent) of calcium hydroxide. The mixture is maintained at 102°–104° C. for 2 hours and 149° C. for 2 hours, and is then cooled to 51° C. at which temperature 27 parts (0.74 equivalent) of calcium hydroxite and 5 parts (0.083 equivalent) of acetic acid are added. After agitating the mixture for 30 minutes, 100 parts of methanol is added and the mixture is bubbled at 49°–53° C. with carbon dioxide at a rate of 4 cubic feet per hour for 6.3 hours. The mixture is then dried by treating it at 149°–158° C. with nitrogen for 4 hours. The residue is filtered. The filtrate has a calcium content of 5.4%, a neutralization number of 18 (basic), a metal ratio of 2.0.

EXAMPLE 9

To 1,048 parts (4 equivalents) of a tetrapropylene-substituted phenol (prepared as in Example 1), there is added over a 3-hour period and at 93°–99° C., 206 parts (4 equivalents) of sulfur dichloride. After maintaining the mixture at 149° C. for 1 hour, it is treated at 149°–154° C. with nitrogen at a rate of 8 cubic feet per hour for 2 hours. To 194 parts (0.7 equivalent) of the above phenol sulfide, 240 parts of mineral oil, and 20 parts of water, there is added at 71° C., 27 parts (0.73 equivalent) of calcium hydroxide. The mixture is maintained at 102°–107° C. for 2 hours and is dried at 160° C. Thereupon, the mixture is cooled to 49° C., 27 parts (0.73 equivalent) of calcium hydroxide and 4.3 parts (0.072 equivalent) of acetic acid are added, and the mixture is agitated for 30 minutes. There is then added 20 parts of methanol and the mixture is bubbled at 49°–54° C. with carbon dioxide at a rate of 4 cubic feet per hour for 10 hours. The mixture is dried at 160° C. and the residue is filtered. The filtrate has a calcium content of 5.7% and a metal ratio of 1.9.

EXAMPLE 10

To 6,050 parts (22 equivalents) of a tetrapropylene-substituted phenol prepared as in Example 1, there is added at 100° C., 1,133 parts (22 equivalents) of sulfur dichloride. The mixture is heated to 150° C. and bubbled with nitrogen until only trace amounts of hydrogen chloride are present in the mixture. To 588 parts (2 equivalents) of the above product, 926 parts of mineral oil, and 60 parts of water, there is added at 70° C., 74 parts (2 equivalents) of calcium hydroxide. The mixture is maintained at 110° C. for 2 hours, dried at 150° C., and cooled to 25° C. whereupon 180 parts of methanol is added. The mixture is heated to 50° C., and 222 parts (6 equivalents) of calcium hydroxide and 38 parts (0.36 equivalent) of calcium butyrate are added. After agitating the mixture for 30 minutes, it is treated at 50° C. with carbon dioxide at a rate of 2 cubic feet per hour for 3 hours. The mixture is dried at 150° C. and the residue is filtered. The filtrate has a calcium content of 6.6%, a neutralization number of 4.7 (acidic), and a metal ratio of 2.9.

EXAMPLE 11

To a mixture of 588 parts (2 equivalents) of the tetrapropylene-substituted phenol sulfide described in Example 1, 926 parts of mineral oil, and 60 parts of water, there is added at 70° C., 74 parts (2 equivalents) of calcium hydroxide. The mixture is maintained at 110° C. for 2 hours, dried at 150° C., cooled to 25° C., and 180 parts of methanol is added. The mixture is then heated to 50° C. and 222 parts (6 equivalents) of calcium hydroxide and 58 parts (0.36 equivalent) of calcium caprylate are added. Thereupon, the mixture is treated at 50°–55° C. with carbon dioxide at a rate of 2 cubic feet per hour for 1.5 hours. The mixture is dried at 150° C. and the residue is filtered. The filtrate has a calcium content of 5.6%, a neutralization number of 7.3 (acidic), and a metal ratio of 2.5.

EXAMPLE 12

To a mixture of 588 parts (2 equivalents) of the tetrapropylene-substituted phenol sulfide described in Example 10, 926 parts of mineral oil, and 60 parts of water, there is added at 70° C., 74 parts (2 equivalents) of calcium hydroxide. The mixture is maintained at 110° C. for 2 hours, dried at 140° C., and cooled to 25° C. whereupon 180 parts of methanol is added. The mixture is then heated to 50° C., and there is added 111 parts (3 equivalents) of calcium hydroxide and 264 parts (0.87 equivalent) of calcium isostearate. After agitating the mixture for 15 minutes, it is bubbled at 55° C. with carbon dioxide at a rate of 2 cubic feet per hour for 1.5 hours. There is then added 111 parts (3 equivalents) of calcium hydroxide and the mixture is treated again at 55° C. with carbon dioxide for 1.5 hours. The mixture is dried at 150° C. and the residue is filtered. The filtrate has a calcium content of 6.3%, a neutralization number of 3.8 (acidic), and a metal ratio of 2.6.

EXAMPLE 13

To 588 parts (2 equivalents) of the tetrapropylene-substituted phenol sulfide described in Example 10, 926 parts of mineral oil, and 60 parts of water, there is added at 70° C., 74 parts (2 equivalents) of calcium hydroxide. The mixture is maintained at 110° C. for 2 hours, dried at 150° C., and cooled to 25° C. whereupon 180 parts of methanol is added. The mixture is heated to 50° C. and 111 parts (3 equivalents) of calcium hydroxide and 384 parts (0.94 equivalent) of a calcium polyisobutene-substituted propionate (the polyisobutene substituent has an average of 22.4 carbon atoms) are added. After agitating the mixture for 15 minutes, it is treated at 55° C. with carbon dioxide at a rate of 2 cubic feet per hour for 1.5 hours. There is then added 111 parts (3 equivalents) of calcium hydroxide and the mixture is treated again at 55° C. with carbon dioxide at a rate of 2 cubic feet per hour for 1.5 hours. The mixture is dried at 150° C. and the residue is filtered. The filtrate has a calcium content of 5.2%, a neutralization number of 3.1 (acidic), and a metal ratio of 2.6.

EXAMPLE 14

To 861 parts (3 equivalents) of the tetrapropylene-substituted phenol sulfide described in Example 9, 1,384 parts of mineral oil, and 90 parts of water, there is added at 70° C., 111 parts (3 equivalents) of calcium hydroxide. The mixture is maintained at 100° C. for 2 hours, dried at 150° C., and cooled to 25° C., whereupon 180 parts of methanol is added. The mixture is heated to 50° C., and there is added 111 parts (3 equivalents) of calcium hydroxide and 276 parts (0.52 equivalent) of a calcium polyisobutene-substituted succinate wherein the polyisobutene substituent contains an average of 66.5 carbon atoms. The mixture is then agitated for 15 minutes and contacted at 50° C. with carbon dioxide until it is substantially neutral. The mixture is dried at 155° C. and the residue is filtered. The filtrate has a calcium content of 3.9%, a neutralization number of 6.8 (acidic), and a metal ratio of 1.6.

EXAMPLE 15

To 1,430 parts (2 equivalents) of the product of Example 9, 360 parts of methanol, and 180 parts of an alcohol mixture containing 65% amyl alcohol and 35% isobutyl alcohol, there is added at 50° C., 129.5 parts (3.5 equivalents) of calcium hydroxide and 30 parts (0.56 equivalent) of calcium acetate. The mixture is treated at 50° C. with carbon dioxide until it is substantially neutral. Thereupon, 129.5 parts (3.5 equivalents) of calcium hydroxide and 14 parts (0.18 equivalent) of calcium acetate are added. The mixture is treated again at 50° C. with carbon dioxide until it is substantially neutral. The mixture is dried at 150° C. and the residue is filtered. The filtrate has a calcium content of 10.4%, a neutralization number of 58 (basic), and a metal ratio of 4.0.

EXAMPLE 16

To 2,092 parts (4 equivalents) of a polyisobutene-substituted succinic anhydride (prepared by mixing at about 200° C. maleic anhydride and a chlorinated polyisobutene having an average chlorine content of 4.3 weight percent and an average of 65.8 carbon atoms), 1,012 parts (4 equivalents) of the tetrapropylene-substituted phenol sulfide described in Example 1, 6,120 parts of mineral oil, and 240 parts of water, there is added at 70° C., 888 parts (24 equivalents) of calcium hydroxide. The mixture is maintained at 110° C. for 2.5 hours, dried at 165° C., and cooled to 50° C. whereupon 480 parts of methanol and 99 parts (1.25 equivalents) of calcium acetate are added. After agitating the mixture for 30 minutes, it is bubbled at 50° C. with carbon dioxide at a rate of 4 cubic feet per hour for 4 hours. The mixture is then dried at 150° C. and the residue is filtered. The filtrate has a calcium content of 3.9%, a neutralization number of 1 (acidic), and a metal ratio of 2.1.

EXAMPLE 17

To 4,410 parts (9 equivalents) of a polyisobutene-substituted phenol (prepared by mixing, at 124°–138° C. and in the presence of a sulfuric-acid treated clay, equimolar proportions of phenol and a polybutene containing an average of 33 carbon atoms), there is added at 105°–110° C., 464 parts (9 equivalents) of sulfur dichloride. The mixture is maintained at 105–110° C. for 3 hours, and is then dried at 150° C. To a mixture of 773 parts (1 equivalent) of the above product, 523 parts (1 equivalent) of the polyisobutene-substituted succinic anhydride described in Example 14, 1,304 parts of mineral oil and 60 parts of water, there is added at 70° C., 222 parts (6 equivalents) of calcium hydroxide. The mixture is maintained at 110° C. for 2.5 hours, dried at 165° C., and is then cooled to 50° C. whereupon 120 parts of methanol and 24 parts (0.3 equivalent) of calcium acetate are added. After agitating the mixture for 1 hour, it is bubbled at 55° C. with carbon dioxide at a rate of 4 cubic feet per hour for 2.5 hours. The mixture is then dried at 150° C. and the residue is filtered. The filtrate has a calcium content of 3.8%, a neutralization number of 2 (acidic), and a metal ratio of 2.7.

EXAMPLE 18

To 5,880 parts (12 equivalents) of the polyisobutene-substituted phenol described in Example 17, there is added at 105°–110° C., 618 parts (12 equivalents) of sulfur dichloride. The mixture is maintained at 105°–110° C. for 2.5 hours and is then dried at 150° C. To a mixture of 3,977 parts (5.85 equivalents) of the above product, 1,321 parts of mineral oil, and 176 parts of water, there is added at 70° C., 216 parts (5.85 equivalents) of calcium hydroxide. The mixture is maintained at 105° C. for 2 hours, dried at 160° C., and is then cooled to 50° C. whereupon 1,050 parts of methanol, 434 parts (11.7 equivalents) of calcium hydroxide and 70 parts (0.88 equivalent) of calcium acetate are added. The mixture is bubbled at 60° C. with carbon dioxide at 2 cubic feet per hour for 4 hours. The mixture is then dried at 180° C. and the residue is filtered. The filtrate has a calcium content of 4.8%, a neutralization number of 6 (basic), and a metal ratio of 2.4.

EXAMPLE 19

To 5,880 parts (12 equivalents) of the polyisobutene-substituted phenol described in Example 17, there is added at 90°–95° C., 556 parts (10.8 equivalents) of sulfur dichloride. The mixture is maintained at 90°–95° C. for 3 hours and is then dried at 150° C. To 3,350 parts (5 equivalents) of the above product, 1,150 parts of mineral oil, and 150 parts of water, there is added 277.5 parts (7.5 equivalents) of calcium hydroxide. The mixture is maintained at 95°–110° C. for 3 hours, dried at 150° C. and is then cooled to 40° C. whereupon 900 parts of methanol, 277.5 parts (7.5 equivalents) of calcium hydroxide, and 64.5 parts (0.75 equivalent) of calcium acetate are added. The mixture is then treated at 60° C. with carbon dioxide at a rate of 2 cubic feet per hour for 3 hours. The mixture is dried at 150° C. and the residue is filtered. The filtrate has a calcium content of 5.2%, a neutralization number of 45 (basic), and a metal ratio of 2.6.

EXAMPLE 20

To 4,900 part (10 equivalents) of a polyisobutene-substituted phenol (prepared by mixing at 51° C. and in the presence of boron trifluoride, equimolar amounts of phenol and a polyisobutene having an average of 28 aliphatic carbon atoms) there is added over a 1.5 hour period and at 105°–115° C., 515 parts (10 equivalents) of sulfur dichloride. The mixture is bubbled at 150° C. with nitrogen for 30 minutes to give the desired phenol sulfide. To 555 parts (1.1 equivalents) of the above product, 734 parts of mineral oil, and 30 parts of water, there is added at 70° C., 37 parts (1 equivalent) of calcium hydroxide. The mixture is maintained at 105° C. for 2 hours, dried at 150° C., cooled to 25° C. and 100 parts of methanol is added. The mixture is then heated to 45° C. and 111 parts (3 equivalents) of calcium hydroxide and 10 parts (0.1 equivalent) of strontium acetate are added. After agitating the mixture for 15 minutes, it is heated at 55° C. with carbon dioxide at a rate of 2 cubic feet per hour for 4 hours. The mixture is dried at 180° C. and the residue is filtered. The filtrate has a calcium content of 4%, a neutralization number of 17 (basic) and a metal ratio of 2.8.

EXAMPLE 21

To 517 parts (1.02 equivalents) of the polyisobutene-substittued phenol sulfide described in Example 20, 697 parts of mineral oil, and 30 parts of water, there is added at 70° C., 37 parts (1 equivalent) of calcium hydroxide. The mixture is maintained at 100°–110° C. for 2 hours, dried at 150° C., and cooled to 25° C. One hundred parts of methanol is added and the mixture is heated to 40° C. whereupon 111 parts (3 equivalents) of calcium hydroxide and 11 parts (0.1 equivalent) of zinc acetate are added. After agitating the mixture for 15 minutes it is treated at 50°–70° C. with carbon dioxide until the mixture is substantially neutral. The mixture is dried at 165° C. and the residue is filtered. The filtrate has a calcium content of 3.8%, a neutralization number of 29 (basic), and a metal ratio of 2.5.

EXAMPLE 22

To 517 parts (1.02 equivalents) of the polyisobutene-substituted phenol sulfide described in Example 20, 719 parts of mineral oil and 30 parts of water, there is added at 70° C., 133 parts (1 equivalent) of strontium hydroxide octahydrate. The mixture is maintained at 100°–110° C. for 4 hours and is dried at 175° C. The mixture is then cooled to 25° C. and 100 parts of methanol and 30 parts (0.5 equivalent) of acetic acid are added. The mixture is heated to 40° C. and 399 parts (3 equivalents) of strontium hydroxide octahydrate is added. After agitating the mixture for 30 minutes, it is contacted at 50°–72° C. with carbon dioxide for 2 hours. The mixture is dried at 185° C. and the residue is filtered. The filtrate has a strontium content of 8.4%, a neutralization number of 1.5 (acidic), and a metal ratio of 2.6.

EXAMPLE 23

To 285 parts (0.6 equivalent) of a polyisobutene-substituted phenol (prepared as in Example 8, except that the polyisobutene has an average of 25 carbon atoms), 139 parts of mineral oil, and 13 parts of water, there is added at 71° C., 31.8 parts (0.86 equivalent) of calcium hydroxide. The mixture is maintained at 102°–105° C. for 3 hours and at 153°–158° C. for 3.3 hours. It is then cooled to 49° C. and 27.3 parts (0.74 equivalent) of calcium hydroxide and 5 parts (0.083 equivalent) of acetic acid are added. After agitating the mixture for 0.5 hour and 53° C. there is added 100 parts of methanol. The mixture is agitated an additional 15 minutes and is then bubbled at 48°–54° C., with carbon dioxide at a rate of 2 cubic feet per hour for 6.5 hours. The mixture is dried by maintaining it at 149° C. for 3 hours and by bubbling the mixture with nitrogen for 5 hours at 150°–152° C. The residue is filtered. The filtrate has a calcium content of 5.5%, a neutralization number of 17.4 (basic), and a metal ratio of 2.6.

EXAMPLE 24

To 1,500 parts (3.16 equivalents) of the polybutene-substituted phenol described in Example 23, 731 parts of mineral oil, and 68 parts of water, there is added at 70° C., 312 parts (8.42 equivalents) of calcium hydroxide. The mixture is maintained at 102° C. for 2 hours. Thereupon, 26.3 parts (0.44 equivalent) of acetic acid is added and the mixture is maintained at 149°–160° C. for 1 hour. The mixture is then cooled to 40° C. and 395 parts of methanol is added. After agitating the mixture for 0.75 hour it is contacted at 49°–53° C. with carbon dioxide for 5.5 hours. Mineral oil (448 parts) is added and the mixture is dried by maintaining the temperature at 153°–168° C. for 3 hours. The residue is filtered. The filtrate has a calcium content of 5.5%, and a metal ratio of 2.7.

EXAMPLE 25

A product is obtained by the procedure of Example 3 except that the 1-propanol is omitted, 122 parts (1 equivalent) of benzoic acid is used in lieu of acetic acid, and the mixture is dried at 205° C.

EXAMPLE 26

A product is obtained by the procedure of Example 20 except that 138 parts of ethanol is used in lieu of methanol, and 4.8 parts (0.025 equivalent) of lead isobutyrate is used in lieu of strontium acetate.

EXAMPLE 27

To 535 parts (1 equivalent) of a polyisobutene-substituted phenol sulfide prepared as in Example 3, 500 parts of mineral oil and 300 parts of water, there is added, at 70° C., 44 parts (1.2 equivalents) of calcium hydroxide. The mixture is heated to and maintained for 4 hours at 100°–110° C. and then dried at 170° C. Thereafter, 111 parts (3 equivalents) of calcium hydroxide, 11 parts (0.078 equivalent) of calcium benzoate, and 150 parts of methanol are added and the mass is contacted at 80° C. with carbon dioxide for 2.5 hours. The carbonated mass is dried at 150° C. and the residue filtered. The filtrate has a calcium content of 4.7%, a neutralization number of 28 (basic), and a metal ratio of 3.0.

EXAMPLE 28

The procedure of Example 27 is repeated except 12.5 parts (0.08 equivalent) of calcium salicylate is used in lieu of calcium benzoate. The filtrate has a calcium content of 5.1%, a neutralization number of 19 (basic), and a metal ratio of 3.2.

EXAMPLE 29

To 530 parts (1 equivalent) of the polyisobutene-substituted phenol sulfide described in Example 23 and 550 parts of mineral oil, there is added, at 90° C., 40 parts (1.08 equivalents) of calcium hydroxide, and 300 parts of water. The mass is refluxed at 108° C. for 2 hours and then dried at 160° C. Thereafter, the mass is cooled to 70° C. and there is added 250 parts of methanol, 182 parts (4.92 equivalents) of calcium hydroxide, and 24 parts (0.15 equivalent) of calcium acetate. Carbon dioxide is introduced into the mass at 65°–70° C. The carbonated mass is dried at 180° C. and the residue filtered. The filtrate has a calcium content of 7.3%, a neutralization number of 11 (basic), and a metal ratio of 4.7.

EXAMPLE 30

To a mixture of 4,000 parts (8 equivalents) of polyisobutene-substituted phenol (the polybutene containing an average of 25 aliphatic carbon atoms), and 1,824 parts of mineral oil, there is added at 105°–110° C. over a period of 11 hours, 824 parts (16 equivalents) of sulfur dichloride. The mixture is maintained at 110° C. for 1 hour and then is bubbled with nitrogen while heating to 150° C. over 4 hours. To 760 parts (1 equivalent) of the above product, 240 parts of mineral oil, and 30 parts of water, there is added at 80° C., 141 parts (3.8 equivalents) of calcium hydroxide. The mixture is maintained at 105° C. for 2 hours and then heated and maintained for 1 hour at 160° C. Thereafter, the mass is cooled to 50° C. and there is added 240 parts of methanol and 16 parts (0.2 equivalent) of calcium acetate. Carbon dioxide is contacted with the mass for 2 hours at 50°–55° C., dried and filtered. The filtrate has a calcium content of 5.9%, a neutralization number of 26 (basic), and a metal ratio of 3.5.

EXAMPLE 31

A mixture of 1,090 parts (1 equivalent) of a neutral calcium salt of a polyisobutene-substituted phenol wherein the polyisobutene substituent contains about 25 aliphatic carbon atoms, 500 parts of methanol, 4 parts (0.05 equivalent) of calcium acetate and 40 parts (1.1 equivalents) of calcium hydroxide is refluxed for 2 hours and then treated with carbon dioxide for 2 hours at a rate of 3 cubic feet per hour. The mass is dried at 150° C. and the residue filtered to give the desired product.

EXAMPLE 32

The procedure of Example 7 is repeated except that 20 parts of sodium acetate is used in lieu of the calcium acetate.

EXAMPLE 33

To 491 parts (0.515 equivalent) of a 54% mineral oil solution of a potassium alkyl salicylate wherein the alkyl group is a polyisobutene group containing an average of 25 aliphatic carbon atoms is added, at 57° C., 137 parts of a 20% solution of calcium chloride in methanol (0.535 equivalent of calcium chloride). Calcium hydroxide, 27 parts (0.693 equivalent), is then added, followed by a solution of 2.6 parts of acetic acid in 3 parts of water. The mixture is heated to 60° C. and blown with carbon dioxide for 4½ hours. It is then heated to 149° C., blown with nitrogen for 2 hours, and filtered. The filtrate contains 4.5% calcium and has a neutralization number (acidic) of 12.

EXAMPLE 34

To 6,018 parts (6.0 equivalents) of a 54% mineral oil solution of a potassium salicylate similar to that described in Example 33, is added at 60° C., a solution of 380 parts (6.9 equivalents) of calcium chloride in 1,520 parts of methanol. There are then added 334 parts (9.02 equivalents) of calcium hydroxide, 51 parts (0.58 equivalent) of calcium acetate monohydrate, and 41 parts of water. The mixture is heated under reflux for ½ hour and is then blown with carbon dioxide at 67° C. for 5 hours. It is then heated to 150° C. while blowing with nitrogen for about 3 hours, cooled and filtered. The filtrate has a calcuim sulfate ash concentration of 17.12% and a neutralization nulber (acidic) of 12. The metal ratio is 2.7.

EXAMPLE 35

A mixture of 3,390 parts (5.1 equivalents) of a calcium salt of a tetrapropylene-substituted salicylic acid, 568 parts of mineral oil, 460 parts of methanol and 284 parts (7.65 equivalents) of calcium hydroxide is heated to 60° C. and blown with carbon dioxide for 4 hours. Then 27 grams (0.5 equivalent) of calcium acetate is added and the material is blown with carbon dioxide for an additional 3 hours, heated to 180° C. for 1 hour and filtered. The filtrate has a calcium sulfate ash content of 16.42% and a neutralization number (acidic) of 19, and has a metal ratio of 1.75.

EXAMPLE 36

To 6,018 parts (6.0 equivalents) of the potassium salicylate used in Example 34 is added a solution of 396 parts (7.2 equivalents) of calcium chloride in 1,584 parts of methanol. The mixture is heated under reflux for one-half hour, cooled to room temperature and blown with nitrogen to remove the methanol. It is then heated to 140° C. to complete methanol removal and cooled to 110° C. A 65:35 (by weight) mixture of isobutyl alcohol and n-amyl alcohol, 1,660 parts, is added, followed by 40 parts of water. The mixture is maintained at 100° C. as a mixture of 834 parts (22.56 equivalents) of calcium hydroxide and 127 parts (1.44 equivalents) of calcium acetate monohydrate are added. The mixture is then blown with carbon dioxide at 100° C. for 4¾ hours, heated to 160° C. and blown with nitrogen. Upon cooling to room temperature and filtering, there is obtained a product with 22.76% calcium sulfate ash, a neutralization number (acidic) of 2 and a metal ratio of 4.5.

EXAMPLE 37

A product is prepared by method similar to that described in Example 36 from 6,018 parts (6.0 moles) of potassium polyisobutene-substituted salicylate, 363 parts (6.6 equivalents) of calcium chloride, 1,452 parts of methanol, 1,680 parts of isobutyl-n-amyl alcohol mixture, 835 parts (22.56 equivalents) of calcium hydroxide, 127 parts (1.44 equivalents) of calcium acetate monohydrate, and 36 parts of water. The product has a metal ratio of 4.8.

EXAMPLE 38

A product is prepared by a method similar to that of Example 36 from 6,018 parts (6.0 equivalents) of potassium polyisobutene-substituted salicylate, 396 parts (7.2 equivalents) of calcium chloride, 1,584 parts of methanol, 792 parts of isobutyl-n-amyl alcohol mixture, 889 parts (24 equivalents) of calcium hydroxide and 90 parts (1.5 equivalents) of acetic acid. After the nitrogen blowing, there are added 999 parts of mineral oil. The product contains 24.90% calcium sulfate ash and has a neutralization number (acidic) of 3 and a metal ratio of 5.0.

EXAMPLE 39

A mixture of 985 parts (1.0 equivalent) of a 53% solution in oil of a potassium polyisobutene-substituted salicylate similar to that of Example 33, 55.5 parts (1.0 equivalent) of calcium chloride and 809 parts of mineral oil is heated to 60° C., and 280 parts of isobutyl-n-amyl alcohol mixture is added. The mixture is heated to 80° C., and 106 parts (2.75 equivalents) of calcium hydroxide, 18 grams (0.209 equivalent) of calcium acetate monohydrate and 6 grams of water are added. The mixture is heated to 150° C. over 1½ hours while blowing with carbon dioxide; the heating causes evaporation of the water and alcohol. It is then blown with nitrogen at 155° C. and filtered.

To the filtrate is added a second portion of 106 grams of calcium hydroxide, 18 grams of calcium acetate monohydrate and 6 grams of water. Heating and carbon dioxide blowing are resumed as above. After filtration, a third increment of calcium hydroxide, calcium acetate and water is added and the mixture is again blown with carbon dioxide. The final filtered product contains 22.26% calcium sulfate ash and has a neutralization number (acidic) of 4. The metal ratio is 6.8.

As stated previously, the hydrocarbon-substituted carboxylic acids and the salts of such acids serve as promoters in the process of this invention. That is, the presence of such acids and salts in the reaction mixtures will facilitate the reaction of the metal base and the acidic material, and will improve the yield of the desired product by as much as 20–40%. These promoters also serve to increase the amount of metal which is incorporated into the metal phenates. These effects are observed by comparing the products obtained in the following examples which do not include the hydrocarbon-substituted carboxylic acids or salts thereof of this invention with the products of certain of the above examples.

EXAMPLE 40

The procedure of Example 30 is repeated except that 148 parts (4 equivalents) of calcium hydroxide is used in lieu of 141 parts, and there is no calcium acetate present. The filtrate has a calcium content of 5.2%, a metal ratio of 3.0, and a neutralization number of 24 (basic). The product of Example 30 has a calcium content of 5.9%, a metal ratio of 3.5, and a neutralization number of 26 (basic).

EXAMPLE 41

The procedure of Example 9 is repeated except that the amount of reactants are reduced by 11% and no acetic acid is present. The filtrate (75% yield) has a calcium content of 3.0%, a metal ratio of 1.05, and a neutralization number of 8.8 (basic). The product of Example 9 was obtained in 90% yield and had a calcium content of 5.7%, a neutralization number of 20 (basic), and a metal ratio of 1.9.

EXAMPLE 42

The procedure of Example 34 is repeated, except that the amounts of the reactants are reduced by approximately ⅙ and the calcium acetate is omitted. The product contains 13.90% calcium sulfate ash and has a metal ratio of 2.1. The product of Example 34 has a calcium sulfate ash content of 17.12% and a metal ratio of 2.7.

The compositions obtained by the process of this invention are useful as dispersants and detergents in lubricating oils, gasolines, and fuel oil. When used in lubricating oils, they are generally present in amounts ranging from about 0.5% to about 20% by weight. The optimum amount of said composition depends to a large extent upon the type of service to which the lubricating composition is to be subjected. For example, lubricating compositions for use in gasoline internal combustion engines may contain from about 0.5 to about 4% by weight of the products of the invention whereas lubricating compositions for use in diesel engines may contain 20% or even more, of the additive. The concentration of the metal salts in a fuel oil or gasoline usually is from about 0.0001% to about 1% by weight.

The lubricating oils in which the salts of this invention are useful may be of synthetic, animal, vegetable or mineral origin. Ordinarily, mineral lubricating oils are preferred by reason of their availability, general excellence, and low cost. For certain applications, oils belonging to one of the other three groups may be preferred. For instance, synthetic polyester oils such as didodecyl adipate and di-2-ethylhexyl sebacate are often preferred as jet engine lubricants. Normally, the lubricating oils preferred will be fluid oils ranging in viscosity from about 40 SUS (Saybolt Universal Seconds) at 100° F. to about 200 SUS at 212° F.

This invention contemplates also the use of other additives with the products of this invention in lubricating compositions. Such additives include, for example, auxiliary detergents and dispersants of the ash-containing or ashless type, oxidation inhibiting agents, corrosion inhibiting agents, viscosity index improving agents, pour point depressing agents, extreme pressure agents, color stabilizers and anti-foam agents.

Ash-containing detergents are exemplified by the oil-soluble neutral and basic salts of alkali or alkaline earth metals with sulfonic acids, carboxylic acids containing at least 12 aliphatic carbon atoms, or organic phosphorus acids characterized by at least one direct carbon-to-phosphorus linkage such as those prepared by the treatment of an olefin polymer (e.g., one having a molecular weight of 700–100,000) with a phosphorizing agent such as phosphorus trichloride, phosphorus heptasulfide, phosphorus pentasulfide, phosphorus trichloride and sulfur, white phosphorus and a sulfur halide, or a phosphorothioic chloride. The most commonly used salts of such acids are those of sodium, potassium, lithium, calcium, strontium, and barium. Basic salts, i.e., those in which the metal is present in stoichiometrically larger amounts than the organic acid radical, are especially useful. The commonly employed methods for preparing the basic salts involve heating a mineral oil solution of an organic acid with a stoichiometric excess of a metal base such as a metal oxide, hydroxide, carbonate, bicarbonate, or sulfide at a temperature of around 50° C. and filtering the resulting mass. The use of a promoter, e.g., a phenol or alcohol, in the neutralization step to aid the incorporation of a large excess of metal is likewise known. A particularly effective method for preparing the basic salts comprises mixing an acid with an excess of a basic alkaline earth metal neutralizing agent, a phenolic promoter compound, and a small amount of water and then carbonating the mixture at an elevated temperature, e.g., 60°–200° C.

The ashless detergents and dispersants include products obtained from the reaction of hydrocarbon-substituted succinic compounds and alkylene polyamines. The products can be further reacted with boric acid, metal compounds, etc.

The extreme pressure agents and oxidation and corrosion inhibitors are exemplified by the chlorinated aliphatic hydrocarbons, organic sulfides and polysulfides, phosphorosulfurized hydrocarbons, phosphorus esters including dihydrocarbon and trihydrocarbon phosphites, metal thiocarbamates, metal phosphorodithioates, metal phosphinodithioates, metal phosphoromonothioates, metal phosphinates, etc.

Pour point depressing agents are illustrated by the polymers of ethylene, propylene, isobutene, and poly-(alkyl methacrylates). Anti-foam agents, include polymeric alkyl siloxanes, poly-(alkyl methacrylates), copolymers of di-acetone acrylamide and alkyl acrylates or methacrylates, and the condensation products of alkylphenol with formaldehyde and an amine. Viscosity index improvers include, e.g., polymerized and copolymerized alkyl methacrylates and polyisobutenes.

Lubricants A through L are illustrative of the lubricating compositions of this invention. Lubricants M and N are lubricating compositions that do not contain a product of this invention and are presented to compare utility in a common test. (All parts are by weight.)

Lubricant A: Parts
SAE 30 mineral lubricating oil _____ 84.85
Product of Example 8 _____ 4.35
An acylated amine obtained from the reaction of 4 equivalents of a polyisobutene (containing an average of 50 aliphatic carbon atoms) substituted succinic anhydride with 3 equivalents of a polyethylene polyamine prepared by reacting ethylene dichloride and ammonia and having a nitrogen content of about 34% _____ 6.24
A basic calcium petroleum sulfonate having a metal ratio of 1.43 _____ 2.23
Calcium salt prepared by reacting 0.75 equivalent of a polybutene (containing an average of 25 carbon atoms) substituted phenol with 0.84 equivalent of calcium hydroxide and with 1.05 equivalents of paraformaldehyde _ 2.00
Zinc salt of a phosphorodithioic acid obtained by the reaction of phosphorus pentasulfide and a mixture of 60% (mole) methylamyl and 40% (mole) isopropyl alcohols _____ 0.33
Poly-(alkyl siloxane) anti-foam agent _____ 0.009

Lubricant B: Parts
SAE 30 mineral lubricating oil _____ 85.90
Product of Example 9 _____ 3.35
Neutral barium salt of an acid obtained by steam treating the reaction product of one equivalent of a polyisobutene (containing an average of 50 aliphatic carbon atoms) with 0.5 equivalent of phosphorus pentasulfide _____ 7.58
Overbased calcium sulfonate having a metal ratio of about 12.5, obtained by carbonating a mineral oil solution of a calcium petroleum sulfonate and an excess of calcium hydroxide in the presence of an aqueous alcohol _____ 2.53
Zinc salt of a phosphorodithioic acid prepared by the reaction of phosphorus pentasulfide and a mixture of 65% (mole) of isobutyl alcohol and 35% (mole) of mixed primary amyl alcohols _____ .064
Poly-(alkyl siloxane) anti-foam agent _____ 0.009

Lubricant C: Parts
SAE 30 mineral lubricating oil _____ 86.26
Product of Example 18 _____ 3.00
The acylated amine described in Lubricant A _ 8.41
Calcium salt prepared by reacting 1 equivalent of a polybutene (containing an average of 25 carbon atoms) substituted phenol with 1.09 equivalents of calcium hydroxide and with 1.5 equivalents of paraformaldehyde __ 2.00
The zinc salt described in Lubricant A _____ 0.33
Poly-(alkyl siloxane) anti-foam agent _____ 0.009

Lubricant D: Parts
SAE 30 mineral lubricating oil _____ 86.26
Product of Example 18 _____ 3.00
The acylated amine product described in Lubricant A _____ 8.41
The calcium salt described in Lubricant C ___ 2.00
The zinc salt described in Lubricant A _____ 0.33
Poly-(alkyl siloxane) anti-foam agent _____ 0.009

Lubricant E: Parts
SAE 30 mineral lubricating oil _____ 86.26
Product of Example 19 _____ 3.00
The acylated amine described in Lubricant A _ 8.41
The calcium salt described in Lubricant C ___ 2.00
The zinc salt described in Lubricant A _____ 0.33
Poly-(alkyl siloxane) anti-foam agent _____ 0.009

Lubricant F: Parts
SAE 30 mineral lubricating oil _____ 86.23
Product of Example 19 _____ 3.00
Product obtained by the reaction of a zinc salt of a polyisobutene (containing an average of 53 carbon atoms) substituted succinic acid and an alkylene polyamine mixture corresponding mostly to pentaethylene hexamine _____ 8.44
The zinc salt described in Lubricant A _____ 0.33
The calcium salt described in Lubricant A ___ 2.00
Poly-(alkyl siloxane) anti-foam agent _____ 0.009

Lubricant G: Parts
SAE 30 mineral lubricating oil _____ 87.26
Product of Example 23 _____ 5.61
Neutral calcium salt of a sulfonated bright stock prepared by treating a mixture of sulfur dioxide and bright stock with sulfur trioxide _____ 5.32
Zinc salt of a phosphorodithioic acid obtained by the reaction of phosphorus pentasulfide and tetrapropylene-substituted phenol ____ 1.81
Poly-(alkyl siloxane) anti-foam agent _____ 0.009

Lubricant H: Parts
SAE 20 mineral lubricating oil _____ 84.3
Product of Example 26 _____ 15.7

Lubricant I: Parts
SAE 20 mineral lubricating oil _____ 99.3
Product of Example 17 _____ 0.7

Lubricant J:    Parts
  SAE 30 mineral lubricating oil _____ 90.66
  Product of Example 23 _____ 4.50
  Acylated amine described in Lubricant A ____ 4.17
  Zinc salt described in Lubricant A _____ 0.67
  Poly-(alkyl siloxane) anti-foam agent _____ 0.009
Lubricant K:    Parts
  SAE 30 mineral lubricating oil _____ 78.21
  Product of Example 33 _____ 6.24
  Zinc salt of the reaction product of 2 equivalents of a polyisobutene-substituted succinic acid with 1 equivalent of a polyethylene polyamine _____ 5.55
  Reaction product of anthranilic acid (0.8 part) with a basic calcium petroleum sulfonate (99.2 parts) _____ 6.25
  Zinc salt of (tetrapropylene - substituted phenyl)-phosphorodithioic acid _____ 3.75
  Poly-(alkyl siloxane) anti-foam agent _____ 0.009
Lubricant L:    Parts
  SAE mineral lubricating oil _____ 81.35
  Product of Example 34 _____ 5.84
  Zinc phosphorodithioate described in Lubricant K _____ 3.75
  Zinc (polyisobutene-substituted succinate) described in Lubricant K _____ 2.50
  Anthranilic acid-calcium sulfonate product described in Lubricant K _____ 6.56
  Poly-(alkyl siloxane) anti-foam agent _____ 0.009
Lubricant M:    Parts
  SAE 30 mineral lubricating oil _____ 83.10
  Acylated amine described in Lubricant A ____ 6.24
  Basic calcium sulfonate described in Lubricant A _____ 3.60
  Overbased calcium sulfonate prepared by carbonating a mixture consisting of calcium petroleum sulfonate, calcium hydroxide and methanol, and then reacting the carbonated product with a minor amount of anthranilic acid _____ 2.61
  Calcium salt described in Lubricant C _____ 2.00
  Zinc salt described in Lubricant A _____ 0.33
  Poly-(alkyl siloxane) anti-foam agent _____ 0.009
Lubricant N:    Parts
  SAE 30 mineral lubricating oil _____ 82.19
  Basic barium petroleum sulfonate _____ 5.00
  Zinc (polyisobutene-substituted succinate) described in Lubricant K _____ 2.50
  Anthranilic acid-calcium sulfonate product described in Lubricant K _____ 6.56
  Zinc phosphorodithioate described in Lubricant K _____ 3.75
  Poly-(alkyl siloxane) anti-foam agent _____ 0.009

The effectiveness of the products of this invention as detergents and dispersants in motor oils is shown by the Caterpillar 1–G engine test. In this test, the lubricating composition to be tested is placed in the crankcase of a four-stroke diesel test engine having a 5⅛″ bore and a compression ratio of 15:1 and operated at a constant speed and B.t.u. input. This test is recognized in the field as an important test to determine the effect of an engine oil on ring sticking, wear, and the accumulation of piston deposits in a 480-hour endurance run. The lubricant is changed at 120-hour intervals. The conditions of the testing operation are as follows:

Speed, ±10 r.p.m. _____ 1,800
Load, b.p.h. _____ 40
Fuel (0.4% sulfur) ±50 B.t.u./min., 0.3 lb./min. __ 5,850
Oil sump temperature, ±5° F. _____ 205°
Oil pressure, ±1 p.s.i. _____ 30
Intake air temperature, ±5° F. _____ 255°
Intake air pressure, ±0.3″ Hg abs. _____ 53.0

The piston is evaluated at the 120-hour intervals for percent top groove filling and total deposits on lands, grooves, groove sides, ring sides, skirt, crown, and under the piston crown (on a scale of 100–0, 100 being indicative of no deposits and 0 being indicative of extremely heavy deposits). The results of the test are shown in Table I.

TABLE I

[Caterpillar diesel test 1–G (0.4% sulfur in fuel)]

| Lubricant | Rating | Time Interval (hours) | | | |
|---|---|---|---|---|---|
| | | 120 | 240 | 360 | 480 |
| A | Top groove filling, percent | 1 | 12 | 20 | 48 |
| | Total deposit, percent | 94.0 | 90.0 | 90.8 | 87.0 |
| C | Top groove filling, percent | 29 | 30 | 41 | 54 |
| | Total deposit, percent | 91.5 | 90.0 | 89.5 | 90.0 |
| E | Top groove filling, percent | 35 | 38 | 34 | 35 |
| | Total deposit, percent | 94.5 | 96.0 | 94.0 | 93.5 |
| F | Top groove filling, percent | 2 | 3 | 7 | 7 |
| | Total deposit, percent | 94.5 | 93.0 | 90.0 | 88.0 |
| G | Top groove filling, percent | 9 | 10 | 18 | 21 |
| | Total deposit, percent | 93.0 | 92.0 | 90.5 | 90.0 |
| M* | Top groove filling, percent | 20 | fail | | |
| | Total deposit, percent | 90 | fail | | |

*Does not contain the product of this invention.

The usefulness of the products of this invention as detergents and dispersants in motor oils is shown also by testing in a 5¾″ bore, supercharged single-cylinder Caterpillar Diesel Test Engine (Caterpillar Test 1–D). This test mainly differs from the preceding test in that a higher sulfur content fuel is used. As in the previous test, the lubricant is changed at 120-hour intervals. The conditions of the testing operation are as follows:

Speed, ±10 r.p.m. _____ 1,200
Load, b.h.p. _____ 42–45
Fuel (0.95–1.05% sulfur), ±50 B.t.u./min., 0.28 lb./min. _____ 5,600
Oil sump temperature, ±5° F. _____ 175°
Oil pressure, ± p.s.i. _____ 30
Intake air temperature, ±5° F. _____ 200
Intake air pressure, ±0.5″ Hg abs. _____ 44.5

The piston is evaluated at the end of each of the 120-hour intervals for percent top groove filling; deposits on lands, grooves, groove sides, ring sides, skirt crown, and under the piston crown (on a scale of 100–0, 100 being indicative of no deposits and 0 being indicative of extremely heavy deposits). The results of this test are shown in Table II.

TABLE II

[Caterpillar diesel test (0.95–1.05% sulfur in fuel)]

| Lubricant | Rating | Time Interval (hours) | | | |
|---|---|---|---|---|---|
| | | 120 | 240 | 360 | 480 |
| B | Top groove filling, percent | 0 | 9 | 35 | 43 |
| | Total deposit, percent | 94.5 | 93.0 | 94.5 | 93.0 |
| D* | Top groove filling, percent | 10 | 22 | | |
| | Total deposit, percent | 95.0 | 89.0 | | |
| J* | Top groove filling, percent | 34 | 36 | | |
| | Total deposit, percent | 92.5 | 85.0 | | |

*Tested for 240 hours only.

Certain of the lubricants containing compositions of this invention were tested in a modification of the Caterpillar 1–G engine test described above. This test is of shorter duration and the piston is evaluated at 48-hour intervals. The conditions of the test are as follows:

Speed, ±10 r.p.m. _____ 1,800
Load, b.h.p. _____ 54
Fuel (1.0% sulfur), ±50 B.t.u./min., 0.37 lb./min. _____ 7,200
Oil sump temperature, ±3° F. _____ 225°
Oil pressure, p.s.i. _____ 31
Intake air temperature, ±3° F. _____ 260°
Intake air pressure, ±0.2″ Hg abs. _____ 68.5

The results of the test are shown in Table III.

TABLE III

| Lubricant | Rating | Time Interval (hours) | |
|---|---|---|---|
| | | 48 | 96 |
| K | Top groove filling, percent | 1 | 1 |
| | Total deposit, percent | 91.5 | 85.0 |
| L | Top groove filling, percent | 19 | 52 |
| | Total deposit, percent | 88.5 | 77.0 |
| N* | Top groove filling, percent | 34 | fail |
| | Total deposit, percent | 84.0 | fail |

*Does not contain the product of this invention.

What is claimed is:

1. In the method for preparing a basic metal phenate by reacting, at a temperature between about 25° C. and the reflux temperature, (A) a hydrocarbon-substituted phenol having at least about 6 carbon atoms in the hydrocarbon substituent, a mixture of said phenol with up to an equivalent amount of a hydrocarbon-substituted succinic acid or anhydride having at least about 6 carbon atoms in the hydrocarbon substituent, or a substantially neutral alkali metal or alkaline earth metal salt of either of the foregoing, (B) about 1–10 equivalents, per equivalent of (A), of a calcium or strontium base, and (C) carbon dioxide;

the improvement which comprises carrying out the reaction in the presence of about 0.002–0.2 equivalent, per equivalent of said calcium or strontium base, of a carboxylic acid having up to about 100 carbon atoms or an alkali metal, alkaline earth metal, zinc or lead salt thereof.

2. The method of claim 1 wherein the metal base is a calcium base.

3. The method of claim 1 wherein the carboxylic acid or salt thereof is acetic acid or calcium acetate.

4. The method of claim 1 wherein the metal base is calcium hydroxide.

5. The method of claim 1 wherein the reaction mixture contains an aliphatic monohydric or polyhydric alcohol.

6. The method of claim 1 wherein the phenolic compound is a hydrocarbon-substituted phenol sulfide.

7. The method of claim 6 wherein the hydrocarbon substituent of the phenol sulfide is a radical derived from a polyisobutene having a molecular weight of about 300–100,000.

8. The method of claim 7 wherein the metal base is a calcium base.

9. The method of claim 8 wherein the reaction mixture contains an aliphatic monohydric alcohol.

10. The method of claim 9 wherein the carboxylic acid or salt thereof is acetic acid or calcium acetate, the metal base is calcium hydroxide and the monohydric alcohol is methanol.

11. The method of claim 1 wherein the phenolic compound is a hydrocarbon-substituted salicylic acid or salt thereof.

12. The method of claim 11 wherein the hydrocarbon substituent of the salicylic acid is a radical derived from a polyisobutene having a molecular weight of about 300–100,000.

13. The method of claim 12 wherein the metal base is a calcium base.

14. The method of claim 13 wherein the reaction mixture additionally contains at least one aliphatic monohydric alcohol.

15. The method of claim 14 wherein the carboxylic acid or salt is acetic acid or calcium acetate, the metal base is calcium hydroxide and the monohydric alcohol is a mixture of isobutyl and n-amyl alcohols, or a mixture thereof with methanol.

16. The product of the method of claim 1.

17. The product of the method of claim 9.

18. The product of the method of claim 14.

19. A lubricating composition comprising a major proportion of a mineral lubricating oil and a minor proportion, sufficient to impart detergency thereto, of the product of claim 17.

20. A lubricating composition comprising a major proportion of a mineral lubricating oil and a minor proportion, sufficient to impart detergency thereto, of the product of claim 18.

References Cited

UNITED STATES PATENTS

| | | | |
|---|---|---|---|
| 2,695,910 | 11/1954 | Asseff et al. | 252—33 |
| 2,781,403 | 2/1957 | Kane et al. | 252—42.7 |
| 2,805,233 | 9/1957 | Bell | 252—42.7 |
| 2,956,018 | 10/1960 | Carlyle et al. | 252—42.7 |
| 3,036,971 | 5/1962 | Otto | 252—42.7 |
| 3,044,961 | 7/1962 | Morway et al. | 252—42.7 XR |
| 3,127,349 | 3/1964 | Rockett | 252—42.7 XR |
| 3,194,761 | 7/1965 | Fox et al. | 252—42.7 |

FOREIGN PATENTS 634,692   1/1962   Canada.

DANIEL E. WYMAN, *Primary Examiner.*

PATRICK P. GARVIN, *Examiner.*